US010005346B2

(12) United States Patent
Kiyota et al.

(10) Patent No.: US 10,005,346 B2
(45) Date of Patent: Jun. 26, 2018

(54) ROOF STRUCTURE FOR TARGA TOP VEHICLE

(71) Applicant: Honda Access Corp., Niiza-shi, Saitama (JP)

(72) Inventors: Noriyuki Kiyota, Niiza (JP); Shoji Yokoyama, Niiza (JP)

(73) Assignee: HONDA ACCESS CORP., Niiza-shi (JP)

( * ) Notice: Subject to any disclaimer, the term of this patent is extended or adjusted under 35 U.S.C. 154(b) by 0 days. days.

(21) Appl. No.: 15/434,566

(22) Filed: Feb. 16, 2017

(65) Prior Publication Data

US 2017/0240032 A1    Aug. 24, 2017

(30) Foreign Application Priority Data

Feb. 19, 2016    (JP) .................. 2016-029785

(51) Int. Cl.
*B60J 7/11*    (2006.01)
*B60J 7/185*    (2006.01)
*B60J 7/06*    (2006.01)
*B60J 7/19*    (2006.01)

(52) U.S. Cl.
CPC ................ *B60J 7/11* (2013.01); *B60J 7/061* (2013.01); *B60J 7/1853* (2013.01); *B60J 7/194* (2013.01)

(58) Field of Classification Search
CPC ..... B60J 7/10; B60J 7/08; B60J 7/1851; B60J 7/1853; B60J 7/11; B60J 7/061
USPC .................................................. 296/218, 219
See application file for complete search history.

(56) References Cited

U.S. PATENT DOCUMENTS

| 5,018,783 A * | 5/1991 | Chamings | ................ B60J 7/064 296/217 |
| 5,360,254 A * | 11/1994 | Sorimachi | .................. B60J 7/04 296/218 |
| 6,398,296 B1 | 6/2002 | Mayer | |

(Continued)

FOREIGN PATENT DOCUMENTS

| JP | 55-148658 A | 11/1980 |
| JP | 3-279016 A | 12/1991 |

(Continued)

OTHER PUBLICATIONS

Official Communication dated Jul. 3, 2017, issued in counterpart United Kingdom Application No. GB1701453.1. (7 pages).

(Continued)

*Primary Examiner* — Dennis H Pedder
(74) *Attorney, Agent, or Firm* — Westerman, Hattori, Daniels & Adrian, LLP

(57) ABSTRACT

In a Targa top vehicle, a detachable roof unit is supported between a front roof arch along an upper edge of a front windshield and a rear roof arch along an upper edge of a rear windshield. The roof unit is fixed to the front roof arch and the rear roof arch by engaging an axially movable front fixing pin with a pin hole of the front roof arch and engaging an axially movable rear fixing pin with a pin hole of the rear roof arch, and an opening formed in a central part of the roof unit is opened and closed by a canvas that can be unfolded and folded. Accordingly, it is possible to achieve a balance between an open feel of the Targa top vehicle and convenience of simply opening and closing the opening of a roof.

3 Claims, 6 Drawing Sheets

(56) References Cited

U.S. PATENT DOCUMENTS

| | | | |
|---|---|---|---|
| 6,428,090 B1 * | 8/2002 | Reinsch | B60J 7/0053 |
| | | | 296/216.08 |
| 9,090,149 B1 | 7/2015 | Binfet et al. | |
| 2008/0116712 A1 | 5/2008 | Cimatti et al. | |
| 2009/0146465 A1 | 6/2009 | Lewis et al. | |
| 2014/0117708 A1 | 5/2014 | Kimmet | |
| 2016/0263976 A1 * | 9/2016 | Bowles | B60J 7/11 |

FOREIGN PATENT DOCUMENTS

| | | |
|---|---|---|
| JP | 6-171371 A | 6/1994 |
| JP | 7-77849 B2 | 8/1995 |
| JP | 2528249 Y2 | 3/1997 |
| JP | 2014-124970 A | 7/2014 |

OTHER PUBLICATIONS

Office Action dated Aug. 9, 2017, issued in counterpart Japanese Application No. 2016-029785, with machine translation. (6 pages).

* cited by examiner

ROOF STRUCTURE FOR TARGA TOP VEHICLE

BACKGROUND OF THE INVENTION

Field of the Invention

The present invention relates to a roof structure for a Targa top vehicle in which a detachable roof unit is supported between a front roof arch along an upper edge of a front windshield and a rear roof arch along an upper edge of a rear windshield.

Description of the Related Art

Japanese Utility Model Registration No. 2528249 or Japanese Patent Publication No. 7-77849 below has made known a canvas unit detachably fitted in an opening formed in a roof of a vehicle, the canvas unit including a rectangular frame-shaped frame, a canvas provided so as to cover an opening of the frame, and a drive mechanism that opens and closes the canvas.

In the conventional arrangement described above, even when the canvas is folded or the canvas unit is detached from the opening of the roof, since left and right edges of the roof opening are defined by left and right roof side rails, there is the problem that the area of the opening is limited and a fully open feel cannot be obtained.

Furthermore, although a Targa top vehicle that supports a detachable roof unit between a front roof arch along an upper edge of a front windshield and a rear roof arch along an upper edge of a rear windshield can give a large opening where left and right roof side rails are not present on detaching the roof unit, when the roof is detached, not only is a place for storing the roof required, but there is also the possibility that an interior of a vehicle compartment becomes wet when it suddenly starts to rain since the roof cannot be fitted easily.

SUMMARY OF THE INVENTION

The present invention has been accomplished in light of the above circumstances, and it is an object thereof to achieve a balance between an open feel of a Targa top vehicle and convenience of simply opening and closing an opening of a roof.

In order to achieve the object, according to a first aspect of the present invention, there is provided a roof structure for a Targa top vehicle in which a detachable roof unit is supported between a front roof arch along an upper edge of a front windshield and a rear roof arch along an upper edge of a rear windshield, wherein the roof unit is fixed to the front roof arch and the rear roof arch by engaging an axially movable front fixing pin with a pin hole of the front roof arch and engaging an axially movable rear fixing pin with a pin hole of the rear roof arch, and an opening formed in a central part of the roof unit can be opened and closed by a canvas that can be unfolded and folded.

In accordance with the first aspect, since the Targa top vehicle supports the detachable roof unit between the front roof arch along the upper edge of the front windshield and the rear roof arch along the upper edge of the rear windshield, in a state in which the roof unit is detached the roof side rails are not present above a head of an occupant, and an open feel of a vehicle compartment can thereby be enhanced. Furthermore, since the roof unit is fixed to the front roof arch and the rear roof arch by engaging the axially movable front fixing pin with the pin hole of the front roof arch and engaging the axially movable rear fixing pin with the pin hole of the rear roof arch, the roof unit can easily be detached and attached. Moreover, since the opening formed in the central part of the roof unit can be opened and closed by the canvas, which can be unfolded and folded, even in a case in which there is no place for storing the roof unit having been detached, not only can the canvas be folded so as to open the opening while the roof unit remains fitted, thus giving an open feel, but when it suddenly starts to rain, compared with a case in which the roof unit has to be attached, the canvas can also be unfolded in a far shorter time, thus avoiding the rain.

According to a second aspect of the present invention, in addition to the first aspect, a drive mechanism for unfolding and folding the canvas is disposed within a projecting portion provided on a lower face of a middle part in a vehicle width direction of a rear part of the roof unit.

In accordance with the second aspect, since the drive mechanism for unfolding and folding the canvas is disposed within the projecting portion provided on the lower face of the middle part in the vehicle width direction of the rear part of the roof unit, it is possible to ensure that there is clearance between the head of occupants in a right seat and a left seat and the projecting portion.

The above and other objects, characteristics and advantages of the present invention will be clear from detailed descriptions of the preferred embodiment which will be provided below while referring to the attached drawings.

DESCRIPTION OF THE PREFERRED EMBODIMENT

An embodiment of the present invention is explained below by reference to FIG. 1 to FIG. 6B. In the present specification, the fore-and-aft direction, left-and-right direction (vehicle width direction), and up-and-down direction are defined with reference to an occupant sitting on a driver's seat.

Figure 1:
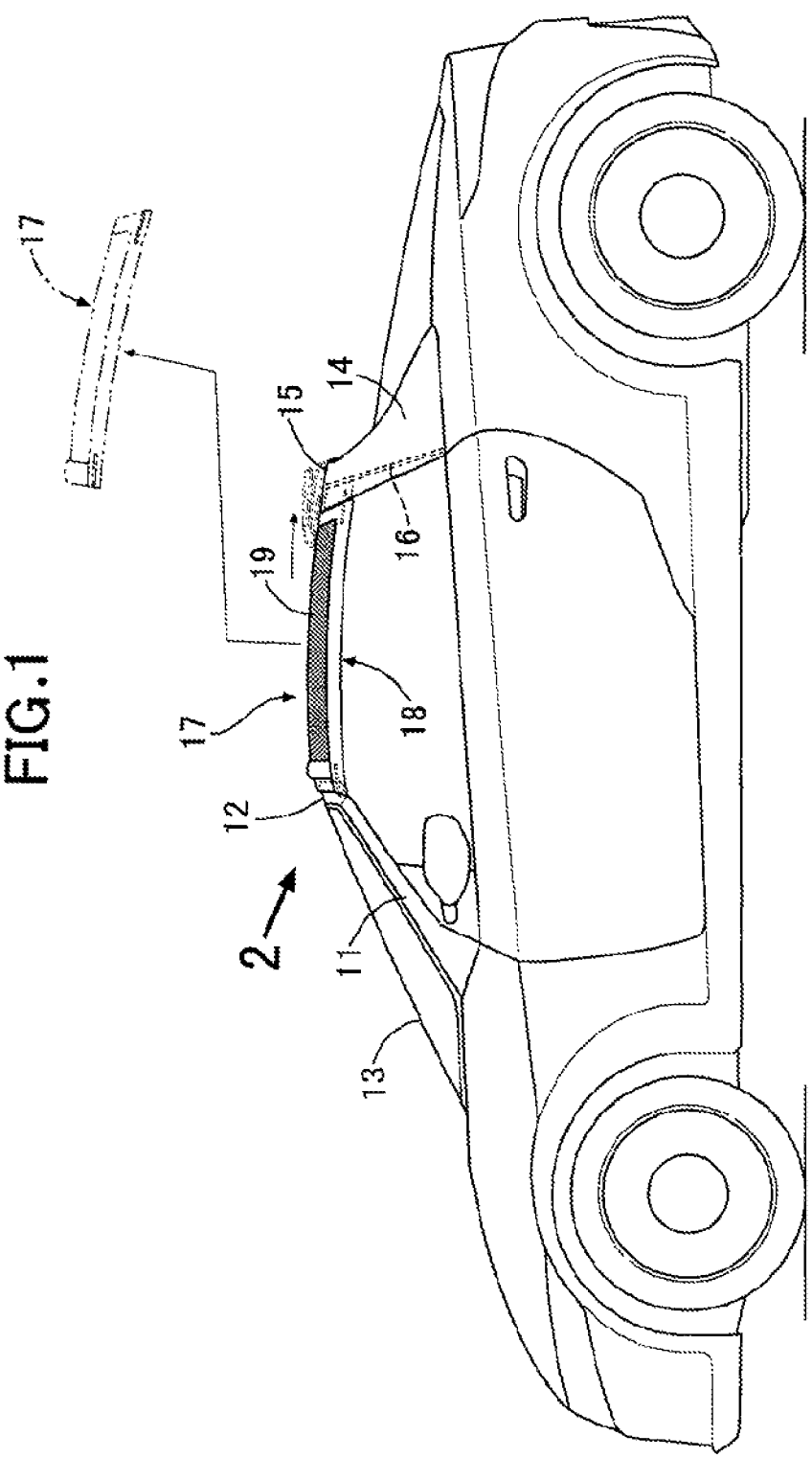
FIG. 1 is a side view of a Targa top vehicle.
Figure 2:
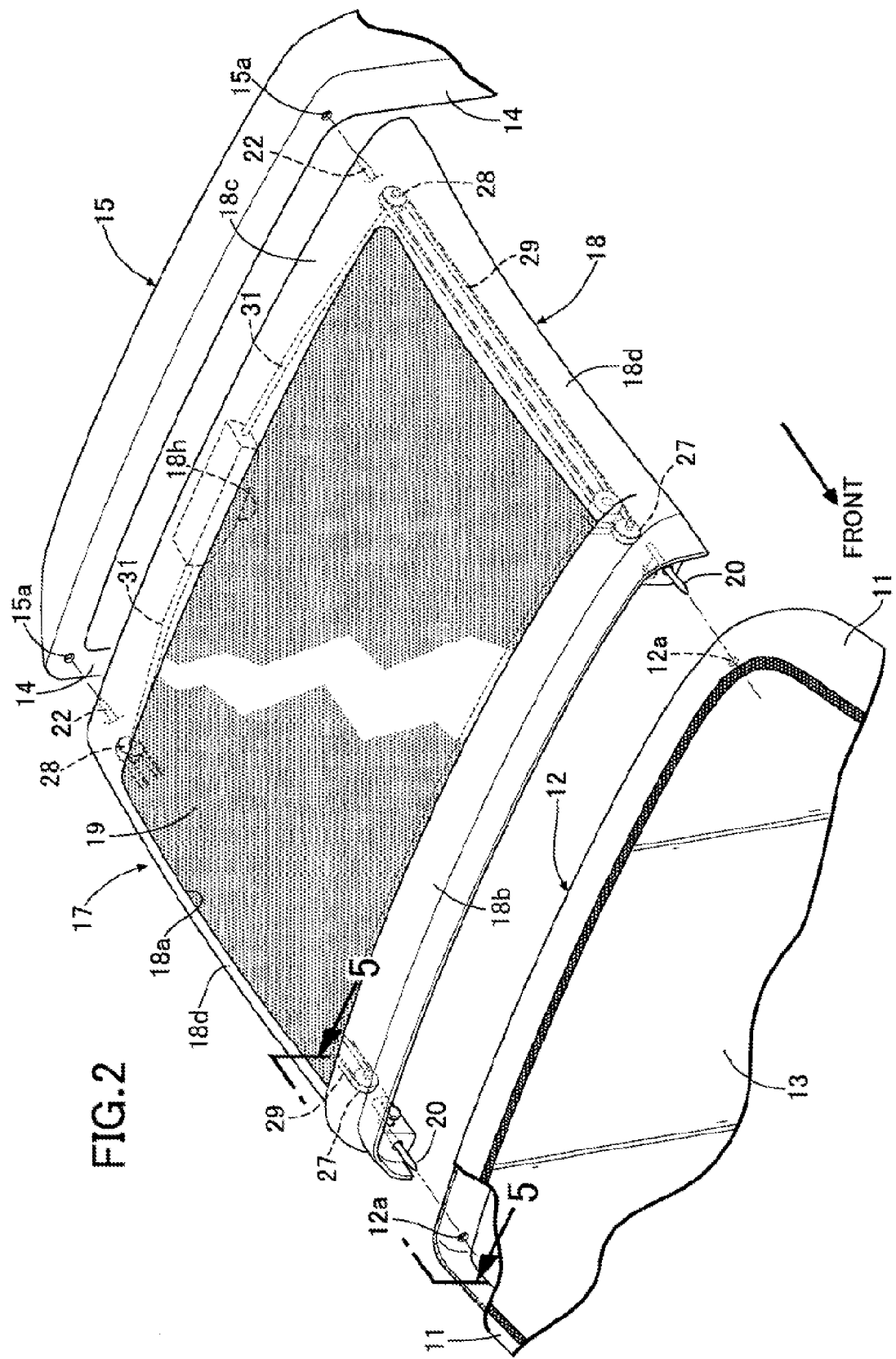
FIG. 2 is a view in a direction of arrow 2 in FIG. 1 (a state which a canvas is unfolded).

As shown in FIG. 1 and FIG. 2, in a two-seater four-wheeled two-door vehicle, left and right edges and an upper edge of a front windshield 13 are supported by left and right front pillars 11 and a front roof arch 12 linking upper ends thereof in the vehicle width direction, and left and right edges and an upper edge of a rear windshield 16 are supported by left and right rear pillars 14 and a rear roof arch 15 linking upper ends thereof in the vehicle width direction. The front edge and the rear edge of a detachable roof unit 17 are fixed to the front roof arch 12 and the rear roof arch 15. The roof unit 17 includes a rectangular frame-shaped roof 18 having an opening 18a formed in the center, the opening 18a of the frame-shaped roof 18 being opened and closed with a canvas 19.

As shown in FIG. 2, FIG. 5, FIG. 6A, and FIG. 6B, a pair of left and right front fixing pins 20 are provided on opposite end parts in the vehicle width direction of a front edge portion 18b of the frame-shaped roof 18. The front fixing pin 20 includes an engagement portion 20a formed at one end, a guide portion 20b formed at the other end, and an operating portion 20c projecting in a direction at right angles from halfway along the guide portion 20b; the front edge portion 18b of the frame-shaped roof 18 has formed therein a guide hole 18e through which the engagement portion 20a of the front fixing pin 20 slidably extends, a guide tube 18f into which the guide portion 20b of the front fixing pin 20 is slidably fitted, and an L-shaped guide groove 18g slidably guiding the operating portion 20c of the front fixing pin 20. A spring 21 is housed in a compressed state in the interior of the guide tube 18f, and the engagement portion 20a of the front fixing pin 20 urged in a direction in which it projects forward from the front edge portion 18b of the frame-shaped roof 18 by means of the elastic force of the spring 21 can engage with a pin hole 12a formed in a rear face of the front roof arch 12.

Similarly, a pair of left and right rear fixing pins 22 having the same structure as that of the front fixing pins 20 are provided on opposite end parts in the vehicle width direction of a rear edge portion 18c of the frame-shaped roof 18, and the rear fixing pins 22 can engage with pin holes 15a formed in a front face of the rear roof arch 15.

Figure 3:
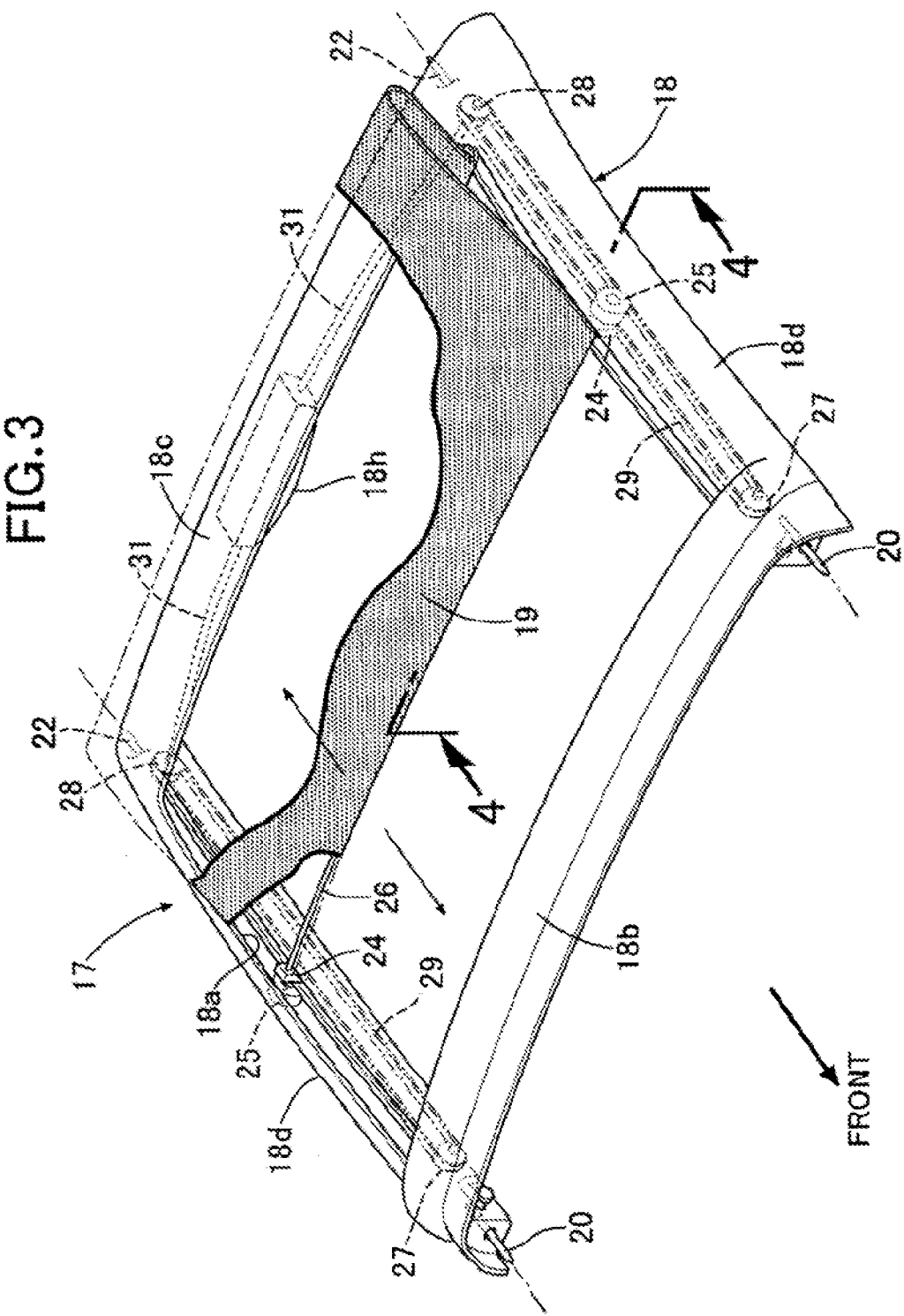
FIG. 3 is an operation explanatory view corresponding to FIG. 2 (in a state in which the canvas is partly folded).
Figure 4:
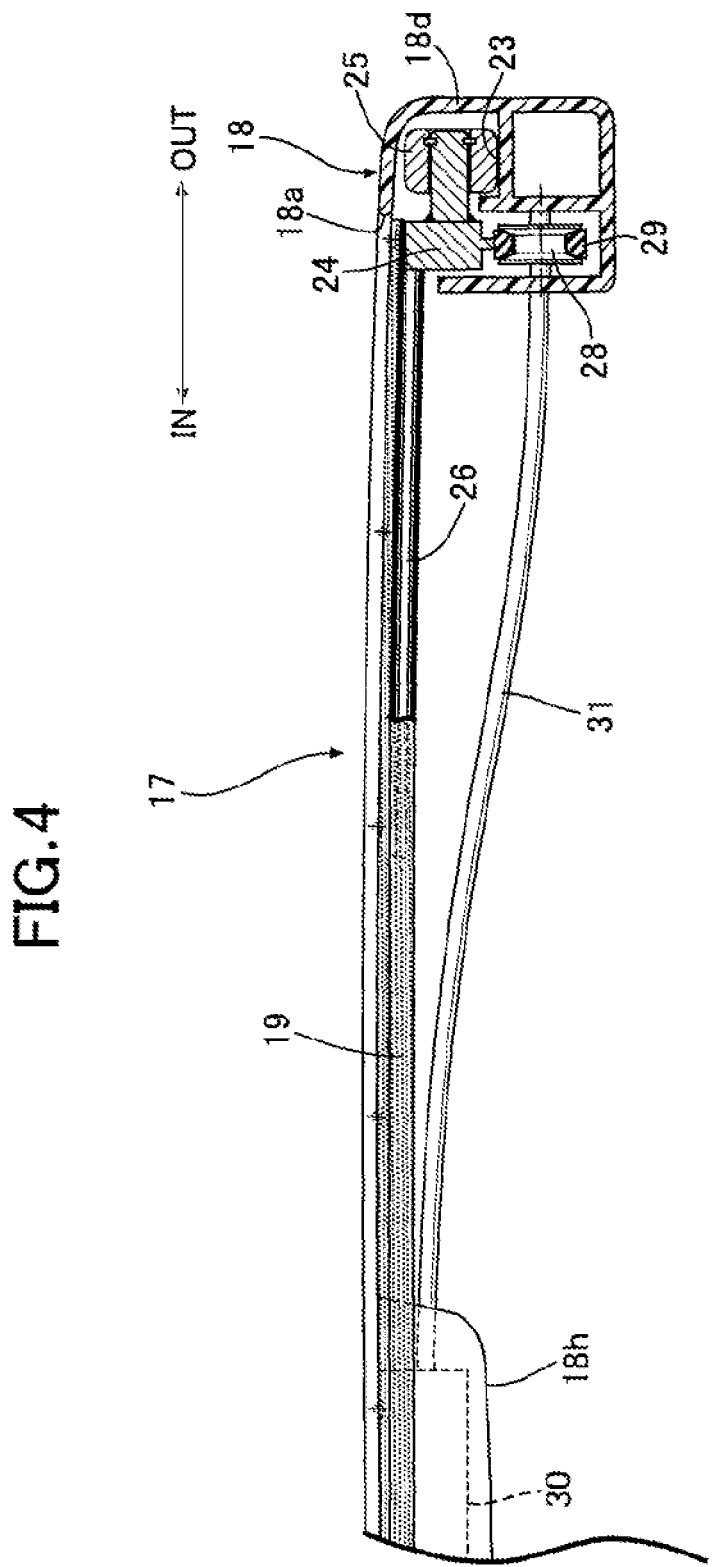
FIG. 4 is a sectional view along line 4-4 in FIG. 3.

As shown in FIG. 2 to FIG. 4, rollers 25 provided on left and right sliders 24 are rollably supported on guide rails 23 formed in the fore-and-aft direction along left and right edge portions 18d of the frame-shaped roof 18, and the front end of the canvas 19 having its rear end fixed to the rear edge portion 18c of the frame-shaped roof 18 is fixed to a rod 26 linking the left and right sliders 24 in the vehicle width direction. Left and right endless belts 29 are wound around follower pulleys 27 provided on front parts of the left and right edge portions 18d and drive pulleys 28 provided on rear pants of the left and right edge portions 18d, the left and right sliders 24 being linked to the left and right endless belts 29 respectively. A drive mechanism 30 formed from an electric motor and a reduction gear disposed in the interior of a projecting portion 18h provided in a middle part in the vehicle width direction of a rear part of the frame-shaped roof 18 so as to project downward (see FIG. 4) is connected to the drive pulleys 28 via flexible shafts 31.

The operation of the embodiment of the present invention having the above arrangement is now explained.

Figure 5:
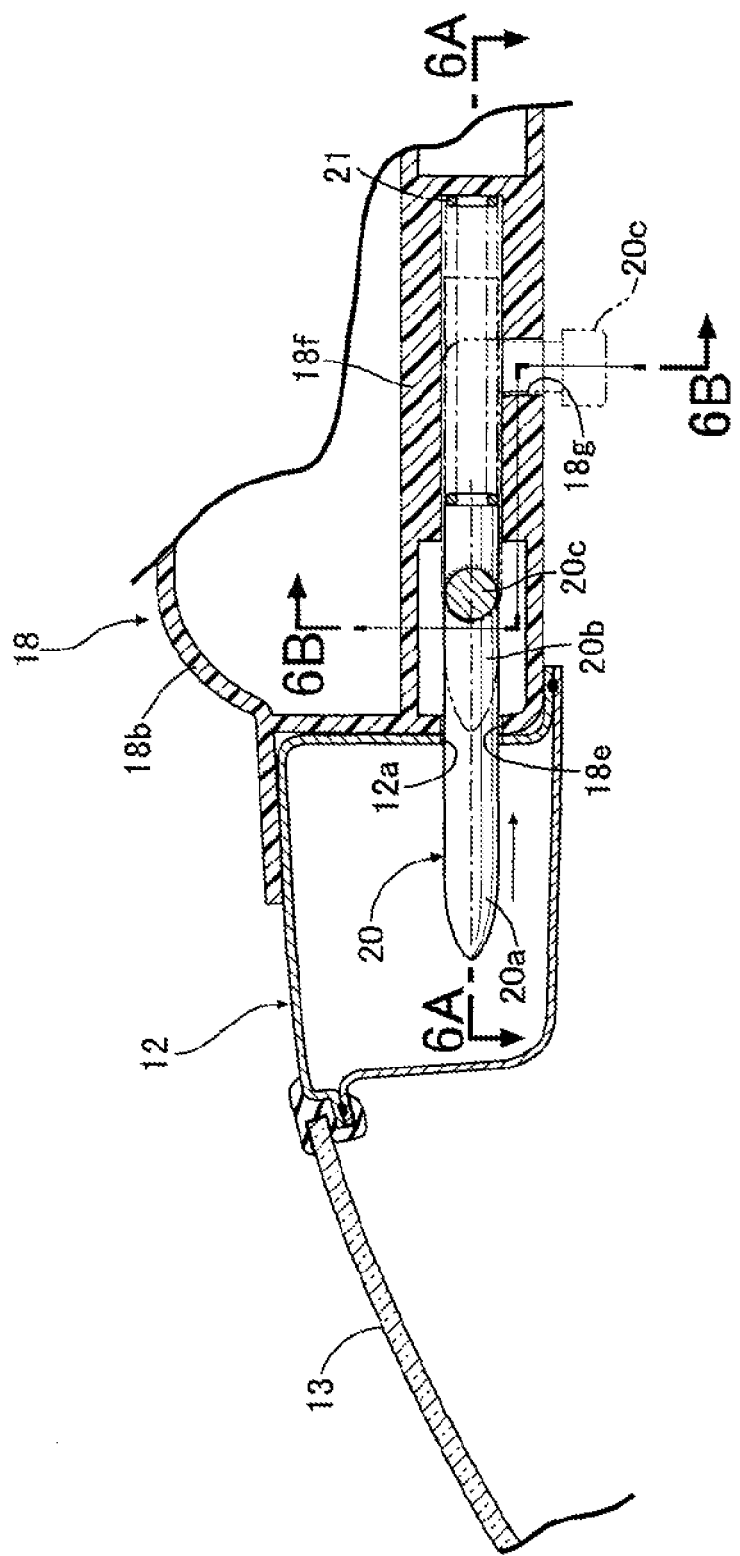
FIG. 5 is a sectional view along line 5-5 in FIG. 1.
Figure 6A:
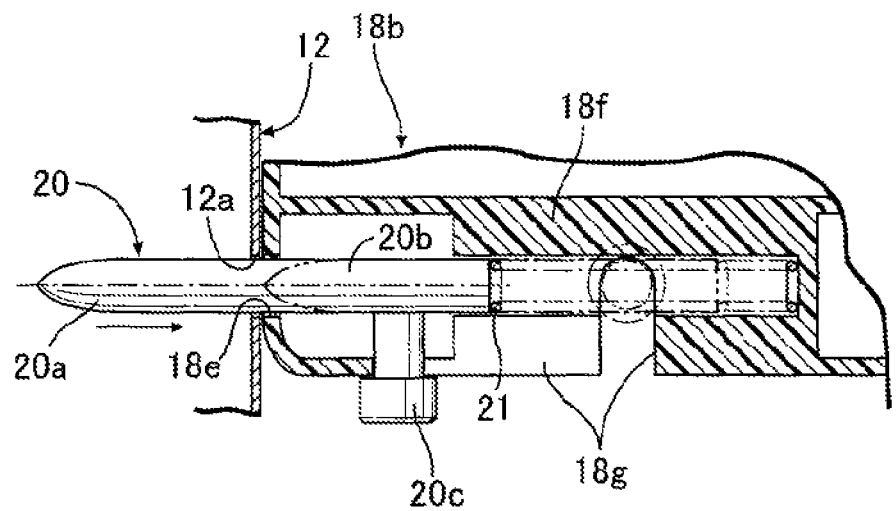
FIG. 6A is a sectional view along line 6A-6A in FIG. 5
Figure 6B:
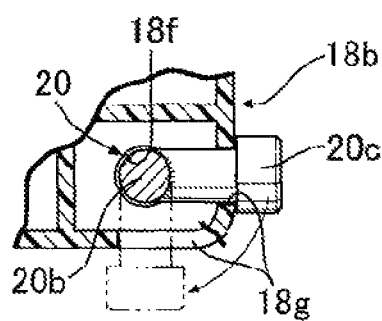
FIG. 6B is a sectional view along line 6B-6B in FIG. 5.

As shown by the chain lines in FIG. 5, FIG. 6A, and FIG. 6B, when not in use, the front fixing pins 20 of the roof unit 17 are housed within the front edge portion 18b of the roof unit 17 due to the operating portions 20c being latched in the guide grooves 18g in a state in which the guide portions 20b compress the springs 21, and similarly the rear fixing pins 22 are also housed within the rear edge portion 18c of the roof unit 17. In a state in which the roof unit 17 is positioned with respect to the front roof arch 12 and the rear roof arch 15, rotating the operating portions 20c of the front fixing pins 20 and the rear fixing pins 22 through 90° makes the front fixing pins 20 and the rear fixing pins 22 project by virtue of the elastic force of the springs 21 as shown by the solid lines in FIG. 5, FIG. 6A, and FIG. 6B and engage with the pin holes 12a of the front roof arch 12 and the pin holes 15a of the rear roof arch 15 respectively, and the roof unit 17 is thereby fitted to the front roof arch 12 and the rear roof arch 15.

Carrying out the above procedure in the reverse order enables the roof unit 17 to be detached from the front roof arch 12 and the rear roof arch 15.

In FIG. 2 to FIG. 4, when the drive mechanism 30 is driven, the driving force thereof is transmitted to the drive pulleys 28 via the flexible shafts 31, the left and right endless belts 29 wound from the drive pulleys 28 to the follower pulleys 27 rotate, and the rod 26 whose sliders 24 are guided by the guide rails 23 is thereby moved in the fore-and-aft direction. As a result, the front end of the canvas 19 moves in the fore-and-aft direction; when it moves forward the opening 18a is closed, and when it moves rearward the opening 18a is opened.

As described above, since the Targa top vehicle supports the detachable roof unit 17 between the front roof arch 12 and the rear roof arch 15, in a state in which the roof unit 17 is detached the roof side rails are not present above the head of an occupant, and the open feel of the vehicle compartment can thereby be enhanced. Moreover, in a case in which it is desired that the vehicle dynamic performance is exhibited to the maximum such as when driving on a circuit, the entire roof unit 17 can be detached, thus lightening the vehicle body weight.

The roof unit 17 can easily be detached and attached since the roof unit 17 is fixed to the front roof arch 12 and the rear roof arch 15 by engaging the front fixing pins 20 and the rear fixing pins 22 with the pin holes 12a and 15a. Furthermore, since the opening 18a of the frame-shaped roof 18 of the roof unit 17 can be opened and closed with the canvas 19, which can be unfolded and folded, even in a case in which there is no place for storing the roof unit 17 having been detached, the canvas 19 can be folded so as to open the opening 18a while the roof unit 17 remains fitted, thus giving an open feel. Moreover, when it suddenly starts to rain, compared with a case in which the roof unit 17 has to be attached, the canvas 19 can be unfolded in a far shorter time, thus avoiding the rain.

Furthermore, since the drive mechanism 30 for unfolding and folding the canvas 19 is disposed within the projecting portion 18h provided on the lower face of the middle part in the vehicle width direction of the rear part of the roof unit 17, it is possible to ensure that there is clearance between the head of occupants sitting on left and right seats and the projecting portion 18h.

An embodiment of the present invention is explained above, but the present invention may be modified in a variety of ways as long as the modifications do not depart from the gist of the present invention.

For example, in the embodiment unfolding and folding of the canvas 19 is carried out by means of the drive mechanism 30, but it may be carried out manually.

What is claimed is:

1. A roof structure for a Targa top vehicle, comprising:
   a detachable roof unit configured to be supported on a vehicle body between a front roof arch along an upper edge of a front windshield and a rear roof arch along an upper edge of a rear windshield,
   wherein the roof unit is fixed to the front roof arch and the rear roof arch by engaging an axially movable front fixing pin with a pin hole of the front roof arch and engaging an axially movable rear fixing pin with a pin hole of the rear roof arch, and
   wherein the roof unit comprises an opening formed in a central part thereof and a canvas that can be unfolded and folded, such that the opening can be opened and closed by the canvas, and the roof unit is capable of being detached from the vehicle body without use of a tool by a user operating an operating portion provided on each of the front fixing pin and the rear fixing pin.

2. The roof structure for a Targa top vehicle according to claim 1, wherein a drive mechanism for unfolding and folding the canvas is disposed within a projecting portion provided on a lower face of a middle part in a vehicle width direction of a rear part of the roof unit, the projecting portion projecting from the lower face of the roof unit into an interior of the Targa top vehicle.

3. A roof structure for a Targa top vehicle, comprising:
a detachable roof unit configured to be supported on a vehicle body between a front roof arch along an upper edge of a front windshield and a rear roof arch along an upper edge of a rear windshield,
wherein the roof unit is fixed to the front roof arch and the rear roof arch by engaging an axially movable front fixing pin with a pin hole of the front roof arch and engaging an axially movable rear fixing pin with a pin hole of the rear roof arch, and
wherein the roof unit comprises an opening formed in a central part thereof and a canvas that can be unfolded and folded, such that the opening can be opened and closed by the canvas, and a drive mechanism for unfolding and folding the canvas is disposed on the roof unit, and
when the roof unit is detached from the vehicle body, the drive mechanism is also detached from the vehicle body along with the roof unit.

\* \* \* \* \*